(12) United States Patent
Carroll

(10) Patent No.: US 8,060,937 B2
(45) Date of Patent: Nov. 15, 2011

(54) SYSTEM FOR PROTECTING DOMAIN SYSTEM CONFIGURATIONS FROM USERS WITH LOCAL PRIVILEGE RIGHTS

(75) Inventor: Nicholas M. Carroll, Los Angeles, CA (US)

(73) Assignee: Lieberman Software Corporation, Los Angeles, CA (US)

( * ) Notice: Subject to any disclaimer, the term of this patent is extended or adjusted under 35 U.S.C. 154(b) by 2271 days.

(21) Appl. No.: 10/710,491

(22) Filed: Jul. 15, 2004

(65) Prior Publication Data

US 2006/0015741 A1    Jan. 19, 2006

(51) Int. Cl.
*G06F 21/00* (2006.01)
*G06F 21/24* (2006.01)
*G06F 7/04* (2006.01)

(52) U.S. Cl. .................................. 726/26; 713/182
(58) Field of Classification Search .................. None
See application file for complete search history.

(56) References Cited

U.S. PATENT DOCUMENTS

| | | | |
|---|---|---|---|
| 6,105,027 A * | 8/2000 | Schneider et al. | 707/9 |
| 6,408,336 B1 * | 6/2002 | Schneider et al. | 709/229 |
| 6,446,077 B2 * | 9/2002 | Straube et al. | 707/103 Y |
| 6,466,932 B1 * | 10/2002 | Dennis et al. | 707/3 |
| 6,950,818 B2 * | 9/2005 | Dennis et al. | 707/3 |
| 6,978,379 B1 * | 12/2005 | Goh et al. | 726/10 |
| 6,983,317 B1 * | 1/2006 | Bishop et al. | 709/223 |
| 7,035,910 B1 * | 4/2006 | Dutta et al. | 709/217 |
| 7,162,649 B1 * | 1/2007 | Ide et al. | 713/165 |
| 7,272,625 B1 * | 9/2007 | Hannel et al. | 709/200 |
| 2002/0166052 A1 * | 11/2002 | Garg et al. | 713/182 |
| 2004/0215650 A1 * | 10/2004 | Shaji et al. | 707/102 |
| 2005/0021980 A1 * | 1/2005 | Kanai | 713/182 |

* cited by examiner

*Primary Examiner* — Eleni Shiferaw
*Assistant Examiner* — Jeffery Williams
(74) *Attorney, Agent, or Firm* — Patent Venture Group; Raymond E. Roberts

(57) ABSTRACT

A group change lockout system for protecting the configuration of a securable object in an operating system from members of a locally privileged group, such as the local administrators group, when a security descriptor exists for the securable object that includes a discretionary access control list (DACL). A copy of the security descriptor is made. Then a new access control entry (ACE) is added to the DACL in the copy. This new ACE specifies denying the local administrators group an access right to the securable object. Then the security descriptor in the operating system is overwritten with the copy.

30 Claims, 2 Drawing Sheets

SYSTEM FOR PROTECTING DOMAIN SYSTEM CONFIGURATIONS FROM USERS WITH LOCAL PRIVILEGE RIGHTS

TECHNICAL FIELD

The invention relates generally to computer systems, and more particularly to improvements in security for computer systems.

BACKGROUND ART

Large-scale organizations require large-scale computer networks, or intranets, consisting of many computers all interconnected to a variety of servers and data sources. For Windows™ based systems, a common configuration for these intranets is to organize groups of systems into "domains": a group of many systems under the supervision of a single (or multiple) domain controller machine(s). This architecture allows a system administrator to make domain-wide changes to the configuration of individual machines all from a single location. Ensuring that all the machines in the domain have some common elements configured identically is essential to the proper functioning of a domain and to lowering the total cost of ownership that organizations incur.

FIG. 1 (background art) is a stylized block diagram depicting how a common implementation of this architecture is to establish a single user group on the domain controller machine(s) known as the "Domain Administrators Group," and to then ensure that this Domain Administrators Group is a member of a group with local privileges on each individual workstation being managed. Typically this the Local Administrators Group, and that example is used herein for consistency. [Placing the Domain Administrators Group as a member of the Local Administrators Group is the default configuration for a Windows™ domain.]

Members of the Local Administrators Group on each system are allowed to make any changes to their local system. Thus, when a system administrator who is a member of the Domain Administrators Group attempts to make a change to a local system, the local system accepts him or her as a member of the Local Administrators Group (which has permissions to make any changes on the local system) and allows the change to occur.

It is also common, however, to permit individual users in the domain to be members of the Local Administrators Groups of their own individual computers. This allows them to install software packages and perform minor maintenance without the need for intervention by the system administrators, a highly desirable aspect of reducing the total cost of ownership.

Unfortunately, allowing individual users to be members of the Local Administrators Group can also lead to undesirable consequences which can dramatically increase the total cost of ownership. These sometimes untrained, ill advised, or simply malicious users are able to perform any change locally, including undoing configuration changes made by the system administrators. For example, these local users can simply remove the Domain Administrators Group from the Local Administrators Group, thus preventing the domain administrators from making changes on the local machine. This can lead to security problems and increased cost of ownership for the organization.

DISCLOSURE OF INVENTION

Accordingly, it is an object of the present invention to provide a way to protect domain configurations from users with local administrator rights or other rights on the local machine.

Briefly, a preferred embodiment of the present invention is a method for protecting the configuration of a securable object in an operating system from members of a locally privileged group when a security descriptor exists for the securable object that includes a discretionary access control list (DACL). A copy of the security descriptor is made. Then a new access control entry (ACE) is added to the DACL in the copy. This new ACE specifies denying the locally privileged group an access right to the securable object. Then the security descriptor in the operating system is overwritten with the copy.

An advantage of the present invention is that it allows system administrators to protect certain local configuration settings from the activities of users who have local administrator-privilege rights.

Another advantage, following from the above, is that the invention allows domain administrators to protect local domain-related configuration settings from the activities of such user.

Another advantage, following from both of the above, is that the invention allows domain administrators to prevent local administrators from changing the members of the Local Administrators Group, thus preventing the Domain Administrators Group from being excluded or restricted with respect to membership in the Local Administrators Group.

Another advantage of the invention is that it prevents users and local administrators from seeing their membership in locked-out groups using normal operating system tools, thus creating the ability for system administrators to grant rights to users without those users knowing what memberships conferred those rights.

Another advantage of the invention is that it permits locking out all groups on a system, thus preventing any user from viewing or changing the memberships for any user on that system.

And another advantage of the invention is that it permits restricting changes to groups to only users of tools that can unlock the group, make the changes, and then re-lock the group.

These and other objects and advantages of the present invention will become clear to those skilled in the art in view of the description of the best presently known mode of carrying out the invention and the industrial applicability of the preferred embodiment as described herein and as illustrated in the figures of the drawings.

BRIEF DESCRIPTION OF THE DRAWINGS

The purposes and advantages of the present invention will be apparent from the following detailed description in conjunction with the appended figures of drawings in which.

In the various figures of the drawings, like references are used to denote like or similar elements or steps.

BEST MODE FOR CARRYING OUT THE INVENTION

Figure 1:
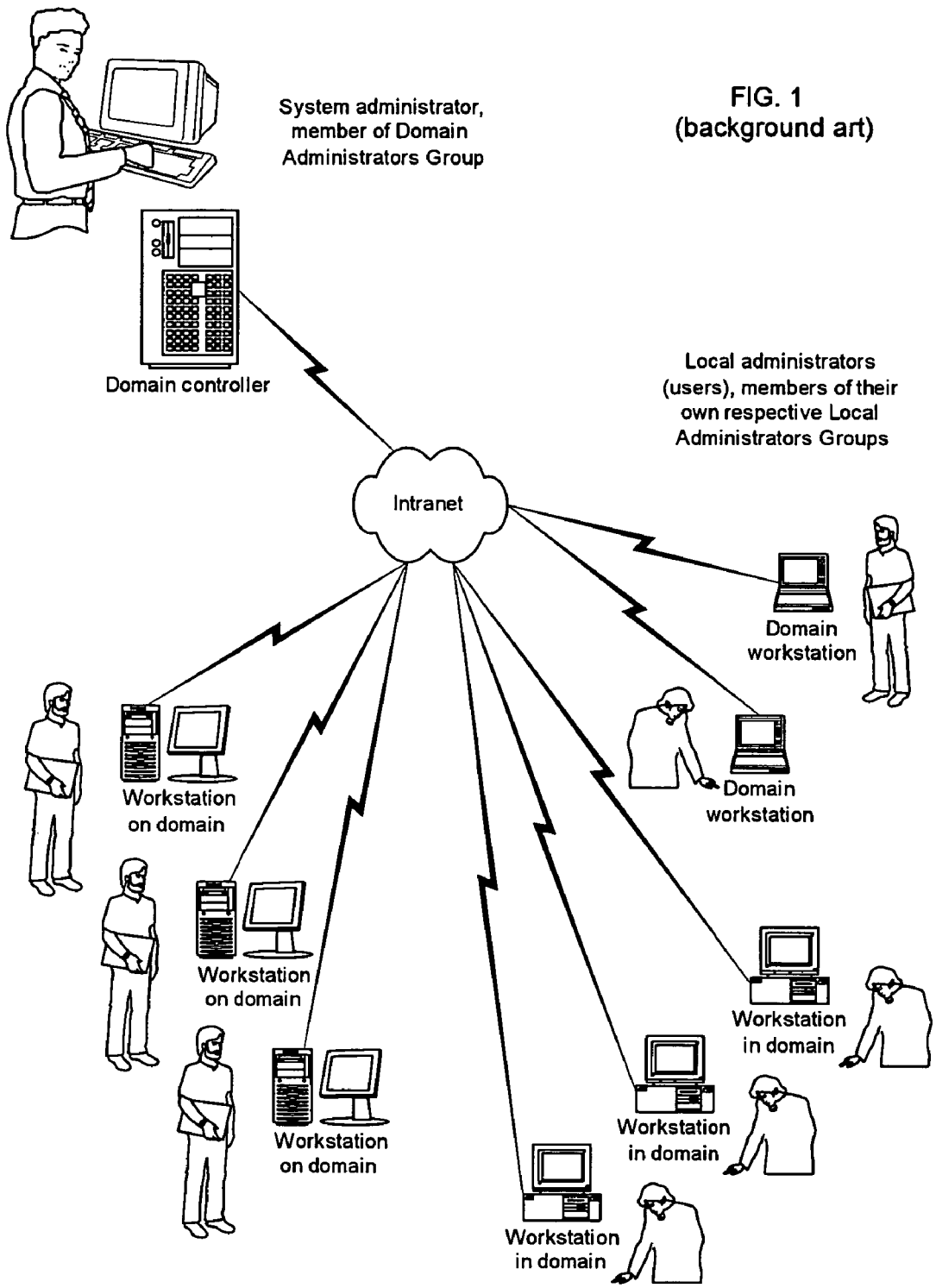
FIG. 1 (background art) is a stylized block diagram depicting how a Domain Administrators Group at a single location manages workstations throughout an organization's intranet where the respective workstation users are members of Local Administrators Groups on their individual workstations.

A preferred embodiment of the present invention is a system for protecting domain configurations from users with local privileges, such as users with local administrator rights. As illustrated in the various drawings herein, and particularly in the view of FIG. 2, preferred embodiments of the invention are depicted by the general reference character 100.

The present invention is a software-based technology that the inventors have termed "Group Change Lockout" that allows domain administrators to protect certain local configuration settings from the activities of users. Of particular importance is the ability of Group Change Lockout to prevent local administrators from changing the members of the Local Administrators Group (hence the name Group Change Lockout). Group Change Lockout prevents a locked-out user from changing the contents or properties of the locked group, thus protecting that group from tampering.

Simply put, Group Change Lockout functions by changing the discretionary access control list (DACL) of an operating system (OS) object representing the group in question (in the example above, the Local Administrators Group). By not allowing local administrators the right to modify the OS object, Group Change Lockout prevents any local administrators from modifying the actual group.

By preventing modifications to certain groups in this manner a domain administrator is able to help ensure that control over the individual systems by the domain administrators will be undisturbed by local administrators.

The approach used by Group Change Lockout has other side-effects, several of which may also be desirable to domain administrators. In particular, the local administrators and users are not able to see their membership in locked-out groups using normal operating system tools, creating the ability for domain administrators to grant rights to users without the users knowing what memberships conferred those rights.

Finally, there are several other potential expanded uses for this method. For example, it can be used to restrict changes to groups to only users of tools that unlock the group, make the changes, and then re-lock the group. Because this locking system is not exposed to the users of the OS, it prevents anyone from undoing the change unless they also have a similarly capable tool. Also, this can be used to lock all groups on a system, thus preventing any user from viewing or changing the memberships for any user on the system.

A large percentage of computer systems today have operating systems (OSs) that selectively control and log access to securable objects by the use of security descriptors. Although many different families of operating system use variations of security descriptors, the Windows™ family of operating systems from Microsoft Corporation of Redmond, Wash. is doubtless the most widely used and well known. Starting with Windows NT and followed by Windows 2000, Windows XP, and Windows 2003, the New Technology File System (NTFS) has been available in Windows. For the sake of simplicity we herein use "NT-class system" to mean all security descriptor based OSs and "NT-class machine" to mean any hardware running such an OS.

Security descriptors are most commonly discussed with respect to files and folders, but it should particularly be kept in mind that a security descriptor can similarly be used for essentially any securable object in an NT-class system. For instance, particular registry keys in typical NT-class systems have security descriptors. The following tables depict representative security descriptor elements and some details about them. Even within the Windows family of OSs, however, there are variations and this information should be taken as merely exemplary.

| SECURITY DESCRIPTOR | | | |
|---|---|---|---|
| Element | | | Description |
| Header | | | Offsets to various structures |
| Audit ACL | ACE | SID | ACEs for the audit ACL (aka SACL, for system ACL) |
| Permissions ACL | ACE | SID | ACEs for permissions ACL (aka DACL, for discretionary ACL) |
| | ... | ... | |
| | ACE | SID | |
| SID (User) | | | Owner of the object |
| SID (Group) | | | |

| HEADER | | |
|---|---|---|
| Offset | Size | Description |
| 0x00 | 1 | Revision |
| 0x01 | 1 | Padding |
| 0x02 | 2 | Control flags |
| 0x04 | 4 | Offset to user SID |
| 0x08 | 4 | Offset to group SID |
| 0x0C | 4 | Offset to user SACL (audit or system ACL) |
| 0x10 | 4 | Offset to user DACL (permissions or discretionary ACL) |

| ACL | | |
|---|---|---|
| Offset | Size | Description |
| 0x00 | 1 | ACL Revision |
| 0x01 | 1 | Padding |
| 0x02 | 2 | ACL size |
| 0x04 | 2 | ACE count |
| 0x06 | 2 | Padding |

| ACE | | |
|---|---|---|
| Offset | Size | Description |
| 0x00 | 1 | Type |
| 0x01 | 1 | Flags |
| 0x02 | 2 | Size |
| 0x04 | 4 | Access mask/Access rights |
| 0x08 | V | SID |

| TYPES | |
|---|---|
| Value | Description |
| 0x00 | Access allowed |
| 0x01 | Access denied |
| 0x02 | System audit |

| FLAGS (for folder) | |
|---|---|
| Value | Description |
| 0x01 | Object inherits ACE |
| 0x02 | Container inherits ACE |
| 0x04 | Don't propagate Inherit ACE |
| 0x08 | Inherit only ACE |

ACCESS MASK/ACCESS RIGHTS

| Bit (range) | Meaning | Description/Examples |
|---|---|---|
| 0–15 | Object specific access rights | Read data, Execute, Append data |
| 16–22 | Standard access rights | Delete, Write ACL, write owner |
| 23 | Can access security ACL | |
| 24–27 | Reserved | |
| 28 | Generic ALL (read, Write, Execute) | Everything below |
| 29 | Generic execute | All things necessary to execute a program |
| 30 | Generic write | All things necessary to write to a file |
| 31 | Generic read | All things necessary to read a file |

SID (SECURITY IDENTIFIER)

| Element | Description |
|---|---|
| S | Security (literally "S") |
| p | Revision number |
| q | NT authority (as 6 bytes, a 48-bit big-endian number) |
| r... | NT sub-authorities (a variable length structure) |

An example registry key including typical SIDs is:

```
HKEY_CURRENT_USER\Software\Microsoft\Windows\Current
    Version\GroupPolicy\GroupMembership Group0 = S-1-5-21-171976846-203539830-4074533433-513
Group1 = S-1-1-0
Group2 = S-1-5-21-839522115-1757981266-2147104195-1006
Group3 = S-1-5-32-544
Group4 = S-1-5-32-545
Group5 = S-1-5-21-171976846-203539830-4074533433-1149
Group6 = S-1-5-21-171976846-203539830-4074533433-1123
Group7 = S-1-2-0
Group8 = S-1-5-4
Group9 = S-1-5-11
Count = dword:0000000a
```

The SID "S-1-5-32-544" (e.g., Group3 above) is a common one. It is the domain-relative SID of the Local Administrators Group on a Windows NT/2K/XP system. This particular SID translates as:

```
Security = "S"
Revision = 1
Sub_authority_count = 2
Identifier_authority =    SECURITY_NT_AUTHORITY
{0,0,0,0,0,5}
Sub_authority[0] = 32     SECURITY_BUILTIN_DOMAIN_RID
Sub_authority[1] = 544    DOMAIN_ALIAS_RID_ADMINS
```

Summarizing and elaborating, a security descriptor basically stores information about an owner of an object and what permissions that "owner" (not necessarily an actual human individual or group) has granted to others. The header of a security descriptor can include offsets and flags. The first access control list (ACL) is an audit ACL, also known as a system ACL or "SACL," and is optional. When present, a SACL contains audit information that controls what events for the object are logged. Since SACLs are not germane here they are not discussed further.

In contrast, the second ACL is almost always present. It is a "permissions" ACL, also known as a discretionary ACL or "DACL." Empty DACLs are possible, where nobody has access to an object, and null DACLs are also possible, where an object has no security at all.

An ACL includes one or more access control entries (ACEs), with each including a security identifier (SID). A security descriptor also includes two SIDs of its own that identify the user and group that own the object it describes.

The SID is a data structure of variable length that uniquely identifies a security account and permits performing access checks against a securable object (e.g., a resource such as files, file directories, printers, Microsoft Exchange mailboxes, Microsoft SQL Server databases, objects that are stored in Active Directory, or anything that is protected by a security descriptor). Every account on a network is issued a unique SID when the account is first created, and the internal processes in the OS then refer to the SIDs rather than to user or group names of accounts.

A relative identifier (RID) is the part of a SID that uniquely identifies an account or group within a domain. In a domain, each domain controller can create accounts and issue each a unique SID. Each domain controller maintains a pool of RIDs that it uses for this.

Turning now to how all of this information pertains to Group Change Lockout, the first major stage in implementing a Group Change Lockout is determining the unique ID token of the group to be modified, that is, its SID. A SID is composed of a hierarchical set of identifiers (called subauthorities) that uniquely identify the type of entity identified, and a RID that uniquely identifies which entity of that type is being accessed.

The hierarchical set of subauthorities for user groups is usually well-known in an NT-class system, so that only the RID needs to be found from the group name to use Group Change Lockout. In NT-class machines the RID values for this are stored in the system registry, in the following key:
HKEY_LOCAL_MACHINE\SECURITY\SAM\Domains\ Builtin\ Aliases If the group to be modified is a "well-known" group in a NT-class system, its RID is also "well-known" and is pre-defined. (For example, the Local Administrators Group is well-known, as it exists on all NT-class machines, and its RID is pre-defined.) If the group to be modified is an arbitrary group, its RID can be discovered by looking in the above location in the registry.

Once the RID of the selected group has been discovered, the registry key that contains the information about that group can be determined, and the security descriptor for that registry key retrieved. As described above, the security descriptor contains all of the security information for a system object, including its DACL that lists the permissions that each entity in the system has for that object.

On NT-class systems, a given object's DACL includes a list of ACEs, entity-permission-action tuples that each specify an entity, a set of permissions, and whether or not those permissions are allowed or denied. [To be complete, as showed above in the tables, each ACE also contains a set of flags which dictate operating system behavior; for example, an ACE might have an "inherit" flag which informs the operating system that this ACE was inherited from a parent object. In fact, when a new ACE is added in an NT-class system these flags are all initialized to zero, to provide a default behavior. For present purposes, these flags can be ignored.]

Thus, a Users Group (entity) may be allowed (allow/deny) to read (permission) a particular file, and the DACL would contain the entry: "Users:allow:read".

Obtaining the security descriptor allows a copy of the DACL for the specified object (in the present case, the group to be locked out) to be constructed.

Once the DACL has been retrieved, its "deny" permissions can be examined to determine whether or not the group has already been locked-out. If so, no further action needs to be taken. This is an optimization step used to prevent adding multiple identical ACE's to the DACL, which would unnecessarily consume additional OS resources, both by requiring longer times to examine the DACL and by requiring an unnecessary write to the system registry to store the redundant ACE. By testing the DACL, creating unnecessary ACE entries can be avoided.

If the group has not been locked-out, a specific ACE is added to the beginning (head) of the list in the DACL. This ACE specifies the group to be locked out, a deny flag, and a "set value" action identifier. In the example described above, in which the Local Administrators Group is being locked out to safeguard domain configurations, the Local Administrators Group would be specified in this new ACE. The new deny ACE would then be added to the head of the list, to preserve the semantics with respect to DACLs. The modified security descriptor (including the modified DACL) is then written back to the system, overwriting the previous DACL.

The way in which the group is stored now assists the invention's effect. The information for user groups in NT-class systems is stored as keys in the protected area of the system registry. Because the security system in NT-class systems handles all security descriptors identically, it applies the "set value" action ACE to the registry key, despite the fact that the registry key in this case represents a user group!

The result of this is that once the modified DACL is written to the system, any member of the locked-out group is unable to modify the values stored in the registry key that describes the group. Any attempt to modify the group's permissions, contents, etc. fails when the system tries to make the change to the registry keys holding the information. Thus, the group is locked-out.

An added benefit of Group Change Lockout is that any application that attempts to open the group with "all-access" will be unable to do so, because a "change value" is a necessary and integral component of "all access." Empirically, it now appears that the operating system tools fall into this category. As a result, the group viewer of the OS is unable to display the locked-out group for any user in the group for which access was locked out, and the group becomes "invisible" to those users.

Figure 2:
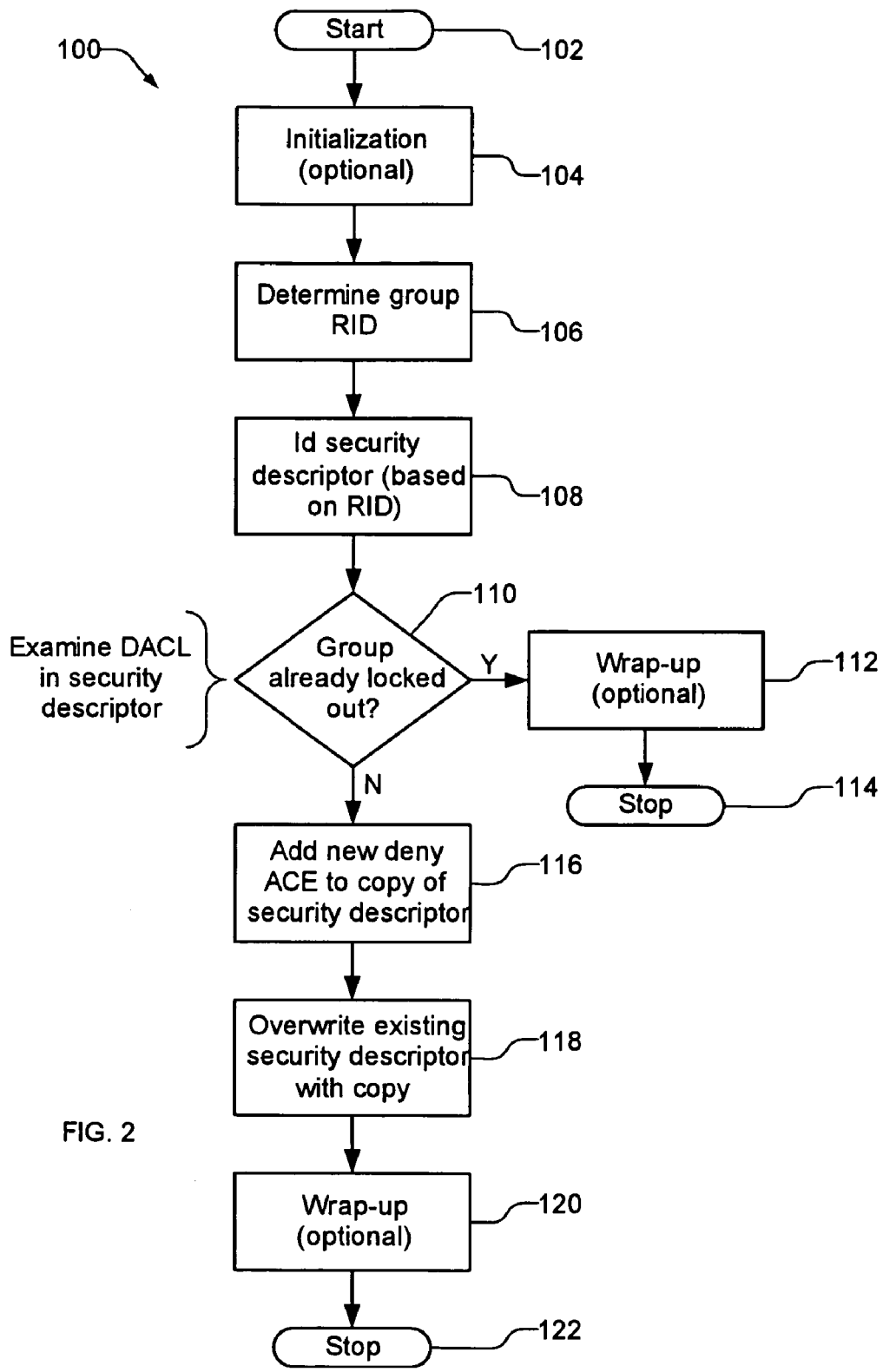
FIG. 2 is flow chart briefly summarizing a Group Change Lockout process in accord with the present invention.

FIG. 2 is flow chart briefly summarizing a Group Change Lockout process (GCL process 100) in accord with the present invention.

The GCL process 100 starts in a step 102, and in an optional step 104 any desired initializations may be performed.

In a step 106 the RID of the group to be locked out (e.g., the Local Administrators Group) is determined.

In a step 108 the security descriptor (and thus the DACL) for the registry key which represents the group is identified by the RID that was retrieved in step 106.

In a step 110 the DACL found in step 108 is examined to determine whether or not the group or user to be locked out has already been denied access (i.e., is already locked-out).

If so, in an optional step 112 any desired wrap-up operations may be performed (e.g., advising a user of the GCL process 100 of the status) and in a step 114 the GCL process 100 ends.

Alternately, if the group is not already locked out, in a step 116 a copy of the security descriptor is modified by adding a new ACE to the beginning of the DACL that will deny the group access.

In a step 118 the modified security descriptor with the new DACL is written over the previous security descriptor, now locking out the group.

In a step 120 any desired wrap-up operations here are performed (e.g., advising a user of the status) and in a step 122 the GCL process 100 ends.

While various embodiments have been described above, it should be understood that they have been presented by way of example only, and not limitation. Thus, the breadth and scope of the invention should not be limited by any of the above described exemplary embodiments, but should be defined only in accordance with the following claims and their equivalents.

INDUSTRIAL APPLICABILITY

The present Group Change Lockout process (GCL process 100) is well suited for application in NT-class systems. As has been described herein, it allows system administrators to protect certain local configuration settings from the activities of users who have local administrator rights. In particular, this can include letting domain administrators protect local domain-related configuration settings from the activities of such local administrators. Regardless of the motivation of users with local administrator rights, such as idle curiosity, well intentioned but untrained or ill advised efforts, or outright malice, for example, the invention allows domain administrators to prevent local administrators from changing the members of the Local Administrators Group. In this manner a domain administrator can protect against the Domain Administrators Group from being excluded or restricted with respect to membership in the Local Administrators Group.

The invention also may be used to prevent users and local administrators from seeing their membership in locked-out groups by using normal operating system tools. This allows system administrators to grant rights to such users without them knowing what memberships conferred those rights, and thus deny them knowledge that can be used to circumvent security measures.

The invention even permits locking out all groups on a system, thus preventing any user from viewing or changing the memberships for any user on that system. And the invention can also be employed to restrict changes to groups to only users of tools (e.g., embodiments of the invention) that can unlock the group, make the changes, and then re-lock the group.

For the above, and other, reasons, it is expected that the Group Change Lockout process of the present invention will have widespread industrial applicability. Therefore, it is expected that the commercial utility of the present invention will be extensive and long lasting.

What is claimed is:

1. A method for protecting the configuration of a securable object in an operating system from members of a locally privileged group, wherein a security descriptor for the securable object includes a discretionary access control list (DACL), the method comprising:
   making a copy of the security descriptor;
   adding a new access control entry (ACE) to the DACL in said copy, wherein said new ACE specifies denying the locally privileged group an access right to the securable object; and overwriting the security descriptor in the operating system with said copy.

2. The method of claim 1, further comprising:
determining a relative identifier (RID) of the securable object; and
finding the security descriptor for the securable object based on said RID.

3. The method of claim 1, further comprising examining the DACL to discover whether said access right is already denied.

4. The method of claim 1, wherein said new ACE is added as a first ACE in the DACL.

5. The method of claim 1, wherein the securable object is a group other than a local administrators group.

6. The method of claim 5, wherein said group is a domain administrator group.

7. The method of claim 6, wherein said domain administrator group is a remotely hosted group, and the method further comprising adding said new ACEs to the DACL in said copy to deny all local groups said access right to the securable object.

8. The method of claim 5, wherein said access right includes a right to change permissions of said group.

9. The method of claim 7, wherein said access right also includes a right to view permissions of said group.

10. The method of claim 1, wherein a single software tool performs the method.

11. A non-transitory computer program, embodied on a computer readable storage medium, for protecting the configuration of a securable object in an operating system from members of a locally privileged group, wherein a security descriptor for the securable object includes a discretionary access control list (DACL), the computer program comprising:
a code segment makes a copy of the security descriptor;
a code segment that adds a new access control entry (ACE) to the DACL in said copy, wherein said new ACE specifies denying the locally privileged group an access right to the securable object; and
a code segment that overwrites the security descriptor in the operating system with said copy.

12. The computer program of claim 11, further comprising:
a code segment that determines a relative identifier (RID) of the securable object; and
a code segment that finds the security descriptor for the securable object based on said RID.

13. The computer program of claim 11, further comprising a code segment that examines the DACL to discover whether said access right is already denied.

14. The computer program of claim 11, further comprising a code segment that provides that said new ACE is added as a first ACE in the DACL.

15. The computer program of claim 11, wherein the securable object is a group other than a local administrators group.

16. The computer program of claim 15, wherein said group is a domain administrator group.

17. The computer program of claim 16, wherein said domain administrator group is a remotely hosted group, and said code segment that adds further adds said new ACEs to the DACL in said copy to deny all local groups said access right to the securable object.

18. The computer program of claim 15, wherein said access right includes a right to change permissions of said group.

19. The computer program of claim 18, wherein said access right also includes a right to view permissions of said group.

20. The computer program of claim 11, wherein all said code segments are part of a single software tool.

21. A system for protecting the configuration of a securable object in an operating system of a computer from members of a locally privileged group, wherein a security descriptor for the securable object includes a discretionary access control list (DACL), the system comprising:
means for making a copy of the security descriptor;
means for adding a new access control entry (ACE) to the DACL in said copy, wherein said new ACE specifies denying the locally privileged group an access right to the securable object; and
means for overwriting the security descriptor in the operating system of the computer with said copy.

22. The system of claim 21, further comprising:
means for determining a relative identifier (RID) of the securable object; and
means for finding the security descriptor for the securable object based on said RID.

23. The system of claim 21, further comprising means for examining the DACL to discover whether said access right is already denied.

24. The system of claim 21, further comprising means for providing that said new ACE is added as a first ACE in the DACL.

25. The system of claim 21, wherein the securable object is a group other than a local administrators group.

26. The system of claim 25, wherein said group is a domain administrator group.

27. The system of claim 26, wherein said domain administrator group is a remotely hosted group, and said means that adds further adds said new ACEs to the DACL in said copy to deny all local groups said access right to the securable object.

28. The system of claim 25, wherein said access right includes a right to change permissions of said group.

29. The system of claim 28, wherein said access right also includes a right to view permissions of said group.

30. The system of claim 21, wherein said means are comprised within a single software tool.

\* \* \* \* \*